(12) United States Patent
Mishra (10) Patent No.: US 9,965,043 B2
(45) Date of Patent: May 8, 2018

(54) METHOD AND SYSTEM FOR RECOMMENDING ONE OR MORE GESTURES TO USERS INTERACTING WITH COMPUTING DEVICE

(71) Applicant: Wipro Limited, Bangalore (IN)

(72) Inventor: Bibhunanda Mishra, New Delhi (IN)

(73) Assignee: Wipro Limited, Bangalore (IN)

( * ) Notice: Subject to any disclaimer, the term of this patent is extended or adjusted under 35 U.S.C. 154(b) by 186 days.

(21) Appl. No.: 15/069,135

(22) Filed: Mar. 14, 2016

(65) Prior Publication Data

US 2017/0212597 A1     Jul. 27, 2017

(30) Foreign Application Priority Data

Jan. 27, 2016 (IN) .............................. 201641002968

(51) Int. Cl.
*G06F 3/01* (2006.01)
*G06K 9/00* (2006.01)

(52) U.S. Cl.
CPC .............. *G06F 3/017* (2013.01); *G06F 9/453* (2018.02); *G06K 9/00355* (2013.01)

(58) Field of Classification Search
CPC ............................... G06F 3/017; G06F 9/4446
See application file for complete search history.

(56) References Cited

U.S. PATENT DOCUMENTS

| 2006/0085767 | A1* | 4/2006 | Hinckley | G06F 3/04883 715/863 |
| 2010/0302138 | A1* | 12/2010 | Poot | G06F 3/011 345/156 |
| 2013/0278501 | A1* | 10/2013 | Bulzacki | G06F 3/017 345/157 |
| 2014/0007020 | A1 | 1/2014 | Park et al. | |
| 2014/0219515 | A1* | 8/2014 | Karakotsios | G06K 9/00355 382/115 |
| 2014/0282270 | A1* | 9/2014 | Slonneger | G06F 3/017 715/863 |
| 2015/0205359 | A1* | 7/2015 | Feng | G06F 3/017 715/863 |
| 2016/0202759 | A1* | 7/2016 | Choi | G06F 1/163 345/156 |

FOREIGN PATENT DOCUMENTS

CN          103608748 A      2/2014

* cited by examiner

*Primary Examiner* — Anil Bhargava
(74) *Attorney, Agent, or Firm* — Finnegan, Henderson, Farabow, Garrett & Dunner LLP (57) ABSTRACT

The present disclosure relates to a method and a system for recommending one or more gestures to a user interacting with a computing device. The system receives gesture data from one or more sensors. Based on the gesture data, for each gesture, system determines a noise score and at least one of proximity score, shape score, and strength score. The noise score is set in order to rank gesture based on the mistake made by user or each time when the gesture was not detected properly by the system. Based on the noise score and at least one of the proximity score, shape score, and strength score, a cumulative score is calculated. If the cumulative score is above a predefined cumulative score then user is recommended to change the gesture. If the cumulative score is below the predefined cumulative score then user is recommended to improve gesture.

17 Claims, 5 Drawing Sheets

METHOD AND SYSTEM FOR RECOMMENDING ONE OR MORE GESTURES TO USERS INTERACTING WITH COMPUTING DEVICE

TECHNICAL FIELD

The present subject matter is related, in general to gesture recommendation, and more particularly, but not exclusively to a method and a system for recommending one or more gestures to a user interacting with a computing device.

BACKGROUND

Advancements in wireless communication technology have greatly increased the versatility of today's wireless communication devices. These advancements have enabled wireless communication devices to evolve from simple mobile telephones and pagers into sophisticated computing devices capable of performing a wide variety of functionality such as multimedia recording and playback, event scheduling, word processing, e-commerce, etc. As a result, users of today's wireless communication devices are able to perform a wide range of tasks from a single, portable device.

As the number of wireless communication devices has increased, so has the demand for more robust and intuitive mechanisms for providing input to such devices. While the functionality of wireless communication devices has significantly expanded, the size constrains associated with these devices renders many input devices associated with conventional computing systems, such as keyboards, mouse, etc., to be impractical.

To overcome this limitation, some smart devices use gesture recognition mechanisms to enable a user to provide inputs to the device via motions or gestures. Firstly, there are various parameters based on which a gesture undergoes machine learning techniques for the smart device to recognize the gesture as an input. Secondly, even the user has to learn to perform the gesture accurately for the smart device to recognize it as an input. Hence, there are two stages of learning i.e machine learning to recognize the gesture and user learning to perform the gesture accurately. The common factor between the two learning is the motor activity of the user. Consider users hand with reduced motor activity and the user not able to provide the gesture input accurately enough for the machine to recognize the input. Hence, the machine learning has to be increased to adapt to users activity. This would need increased processing power and battery resources of the smart device. Also it would result in delay and poor user experience.

The issues mainly faced in providing gesture recommendation are that the machine may not recognize the user input accurately if there is a reduced motor activity and there is no mechanism to provide suggestions to the user to either change the gesture or improve the gesture when the machine does not detect the gesture.

SUMMARY

Disclosed herein is a method and system for recommending one or more gestures to a user interacting with a computing device. The gesture recommendation system receives gesture data from one or more gesture detection sensors. The gestures are ranked based on the gesture data. The parameters considered for ranking are proximity of body part associated with the gesture, strength of the body part and shape of the body part. Based on the ranking, one or more suggestions are provided to the user to improve the gesture or to change the gesture.

Accordingly, the present disclosure relates to a method for recommending one or more gestures to a user interacting with a computing device. The method comprises receiving, by a gesture recommendation system, gesture data from one or more gesture detection sensors for each of the one or more gestures. Based on the gesture data, the gesture recommendation system determines a noise score and at least one of a proximity score, a shape score, or a strength score based on the gesture data. The method further comprises determining a cumulative score using the noise score and at least one of the proximity score, the shape score, or the strength score. Based on the cumulative score, the gesture recommendation system suggests at least of improving the one or more gestures and changing the one or more gestures.

Further, the present disclosure relates to a system for recommending one or more gestures to a user interacting with a computing device. The gesture recommendation system receives gesture data from one or more gesture detection sensors for each of the one or more gestures. The gesture recommendation system determines a noise score and at least one of a proximity score, a shape score, or a strength score based on the gesture data. Thereafter, the gesture recommendation system determines a cumulative score using the noise score and at least one of the proximity score, the shape score, or the strength score. Based on the cumulative score, the gesture recommendation system suggests at least of improving the one or more gestures and changing the one or more gestures.

Furthermore, the present disclosure relates to a non-transitory computer readable medium including instructions stored thereon that when processed by at least one processor cause a gesture recommendation system to receive gesture data from one or more gesture detection sensors for each of the one or more gestures. Based on the gesture data, the gesture recommendation system determines a noise score and at least one of a proximity score, a shape score, or a strength score based on the gesture data. The instructions further cause the processor to determine a cumulative score using the noise score and at least one of the proximity score, the shape score, or the strength score. Based on the cumulative score, the gesture recommendation system suggests at least of improving the one or more gestures and changing the one or more gestures.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a system for recommending one or more gestures to a user interacting with a computing device. The system receives gesture data from one or more gesture detection sensors. In an embodiment, the system and the one or more gesture detection sensors are implemented in the computing device. Based on the gesture data the system determines a noise score and at least one of proximity score, shape score, or strength score for each of the one or more gestures. The noise score is assigned in order to rank the gesture based on the mistake made by user or each time when the gesture was not detected properly by the system. Based on the noise score and at least one of the proximity score, shape score, or strength score, a cumulative score is calculated. If the cumulative score is above a predefined cumulative score then the user is recommended to change the gesture. If the cumulative score is below the predefined cumulative score then the user is recommended to improve the gesture.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
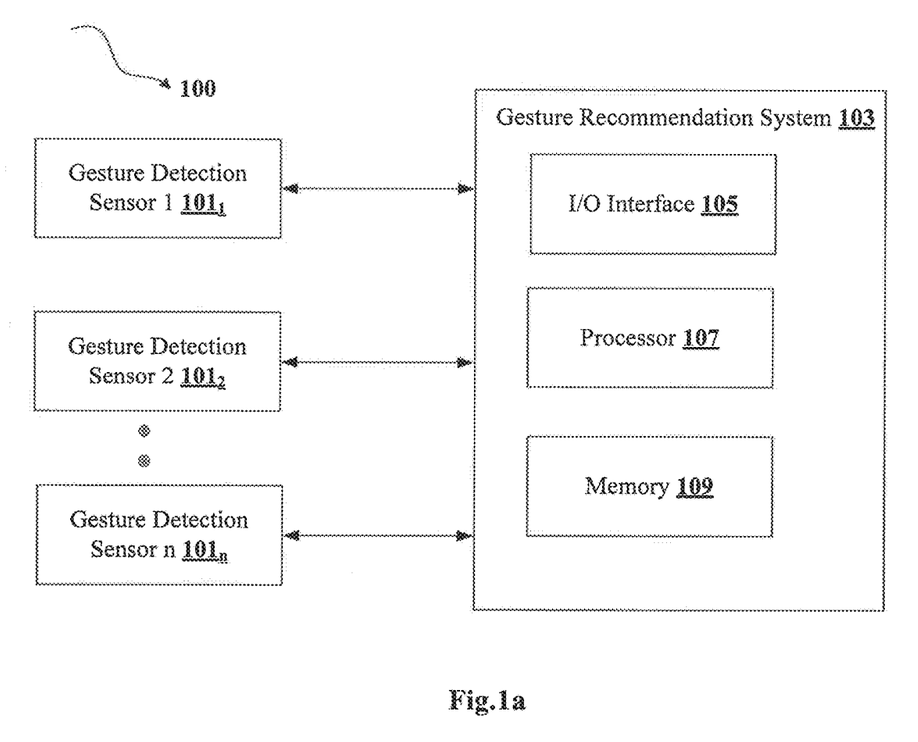
FIG. 1a illustrates environment for recommending one or more gestures to a user interacting with a computing device in accordance with some embodiments of the present disclosure.

FIG. 1a illustrates environment for recommending one or more gestures to a user interacting with a computing device in accordance with some exemplary embodiments of the present disclosure.

The environment 100 comprises one or more gesture detection sensors, gesture detection sensor 1 $101_1$ to gesture detection sensor n $101_n$ (collectively referred as 101) and a gesture recommendation system 103. In one embodiment, the one or more gesture detection sensors 101 and the gesture recommendation system 103 may be implemented in a computing device. In another embodiment, the one or more gesture detection sensors 101 may be associated with the computing device. The one or more gesture detection sensors 101 may include, but not limited to, a proximity sensor, image capturing device, radar and infrared muscle contraction sensor. The computing device may include, but not limited to, a laptop, a mobile phone and a tablet. The one or more gesture detection sensors 101 are configured to capture gesture data and provide the gesture data to the gesture recommendation system 103. The proximity sensor detects proximity of body part associated with gesture from the computing device. As an example, a user of the computing device may use hands for making one or more gestures. Therefore, the proximity sensor detects proximity of the hand from the computing device. The radar is used to detect number of body parts and angular movement of the body parts required to make one or more gestures. As an example, the user may use hands for making the one or more gestures. In this scenario, the radar detects number of fingers used and angular movement of the hand while making the one or more gestures. The IR muscle contraction sensor is used to detect number of muscles involved while making the one or more gestures. The gesture recommendation system 103 comprises an I/O interface 105, a processor 107 and a memory 109. The gesture recommendation system 103 receives gesture data from the one or more gesture detection sensors 101 through the I/O interface 105. The received gesture data is stored in the memory 109 for further processing by the processor 109.

Figure 1B:
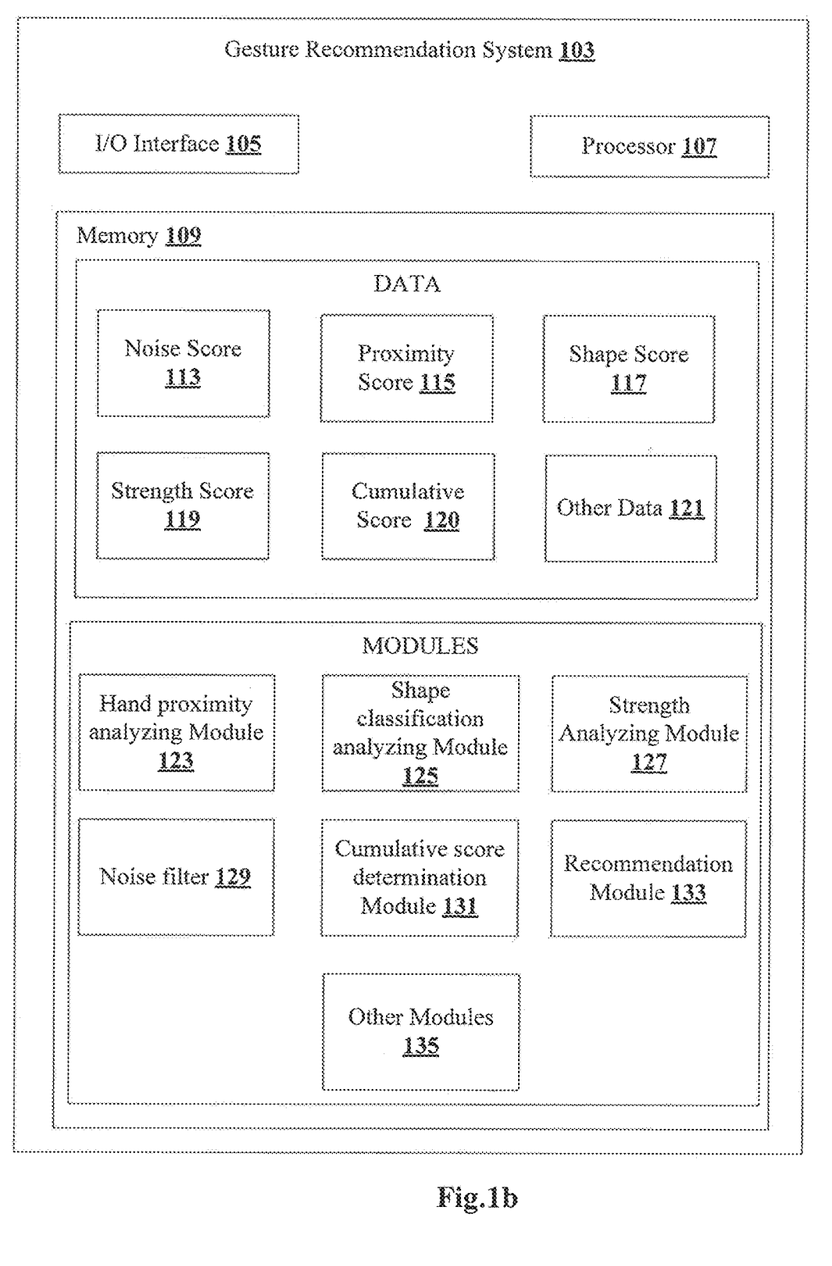
FIG. 1b shows a detailed block diagram illustrating a gesture recommendation system in accordance with some embodiments of the present disclosure.

FIG. 1b shows a detailed block diagram illustrating a gesture recommendation system in accordance with some embodiments of the present disclosure.

In one implementation, the gesture recommendation system 103 determines noise score 113, proximity score 115, shape score 117, strength score 119, and a cumulative score 120 based on the gesture data which are stored in the memory 109. In an embodiment, the gesture recommendation system 103, also stores other data 121 in the memory 109. In the illustrated FIG. 1b, one or more modules stored in the memory 109 are described herein in detail.

In one embodiment, the data may be stored in the memory 119 in the form of various data structures. Additionally, the aforementioned data can be organized using data models, such as relational or hierarchical data models. The other data 121 may store data, including temporary data and temporary files, generated by modules for performing the various functions of the gesture recommendation system 103.

In an embodiment, the noise score 113 represents a counter value to rank the gesture. The noise score 113 is assigned based on the mistakes made by the user while making the gesture or each time the gesture was not detected correctly by the computing device.

In an embodiment, the proximity score 115 is assigned based on proximity of the hand making the gesture from the computing device. The more proximal the hand is from the computing device, the proximity score 115 increases.

In an embodiment, the shape score 117 is assigned based on the shape of the hand during the gesture. The shape score 117 is assigned in the decreasing order of complexity of the shape of the hand during the gesture.

In an embodiment, the strength score 119 is assigned based on the number of muscles that move during the gesture. The strength score 119 is assigned in the decreasing order of number of muscles used to make the gesture.

In an embodiment, the cumulative score 120 is calculated based on the noise score 113 and at least one of the shape score 117, proximity score 115, or strength score 119. If the cumulative score 120 is more than a predefined cumulative score, then the user is recommended to change the gesture. But if the cumulative score 120 is less than the predefined cumulative score then the user is recommended to improve the gesture. In an exemplary embodiment, the Cumulative Score is calculated based on the below mentioned equation.

Cumulative Score=Noise Score+Proximity Score+ Shape Score+Strength Score

In one implementation, the modules may include, for example, hand proximity analyzing module 123, shape classification module 125, strength analyzing module 127, noise filter 129, ranking module 131, recommendation module 133 and other modules 135. The other modules 135 may be used to perform various miscellaneous functionalities of the gesture recommendation system 103. It will be appreciated that such aforementioned modules may be represented as a single module or a combination of different modules.

In an embodiment, the hand proximity analyzing module 123 may be configured to receive input from the proximity sensor. Upon receiving the input, the hand proximity analyzing module 123 may determine a proximity score 115 based on the distance between body parts associated with the one or more gestures from the computing device.

In an embodiment, the shape classification analyzing module 125 may be configured to receive input from an image sensor or radar. Upon receiving the input, a shape score 117 may be determined for each of the one or more gesture based on number of body parts required and angular movement of the body parts required to make the one or more gestures. The shape score 117 may be assigned in increasing order of number of body parts required and angular movement of the body parts required to make each of the one or more gestures.

In an embodiment, the strength analyzing module 127 may be configured to receive input from infrared muscle contraction sensor. Upon receiving the input, a strength score 119 may be determined for each of the one or more gestures based on number of muscles used to make each of the one or more gestures.

In an embodiment, a noise filter 129 may be configured to detect mistakes made by the user during the one or more gestures or when the one or more gestures were not detected by the computing device. The noise score 113 represents a counter value to rank the gesture. The noise score 113 may be determined for each of the one or more gestures based on at least one of false positives associated with the one or more gestures or errors detected with the one or more gestures. The false positives associated with the one or more gestures may be the mistakes made by the user while making the one or more gestures. The errors detected with the one or more gesture may be each instant when each of the one or more gestures was not detected correctly by the computing device.

In an embodiment, a cumulative score module 131 may be configured to calculate a cumulative score based on the noise score 113 and at least one of the strength score 119, proximity score 115, or shape score 117. If the cumulative score is more than a predefined cumulative score then the user may be recommended to change the gesture. If the cumulative score is less than the predefined cumulative score, then the user may be recommended to improve the gesture. The cumulative score may be result of an arithmetic operation such as summation, multiplication, convolution of the noise score 113 and at least one of proximity score 115, shape score 117 or strength score 119.

In an embodiment, the recommendation module 133 may recommend suggestions to the user to change the one or more gestures or to improve the one or more gestures based on the cumulative score.

Figure 1C:
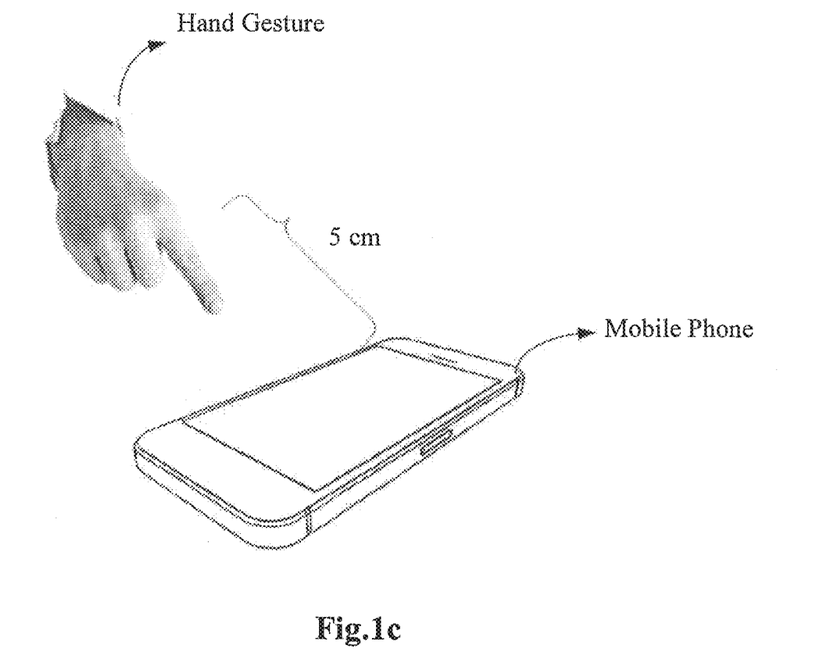
FIG. 1c illustrates an exemplary environment for recommending one or more gestures to a user interacting with a computing device in accordance with some embodiments of the present disclosure.
Figure 1D:
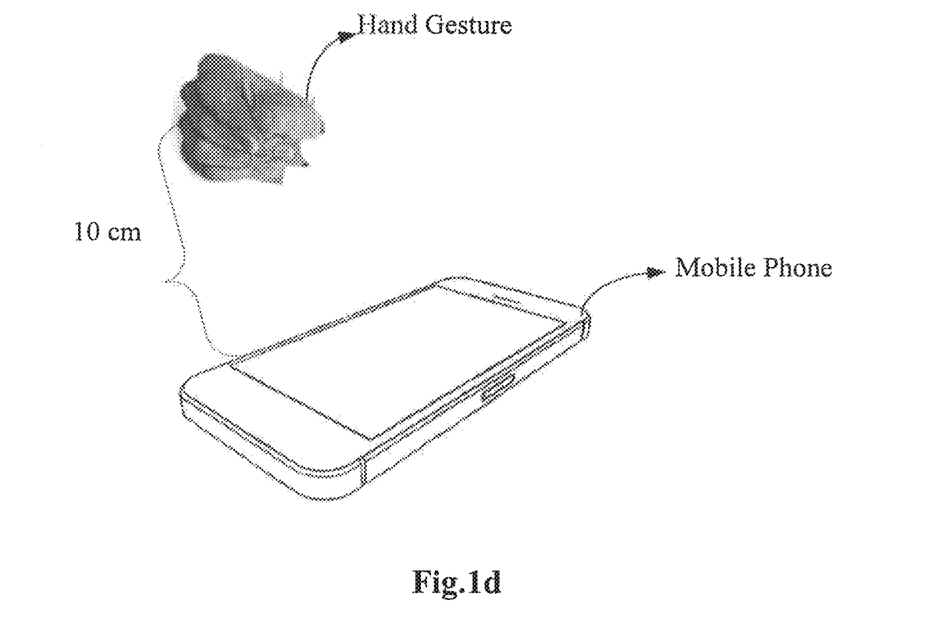
FIG. 1d illustrates another exemplary environment for recommending one or more gestures to a user interacting with a computing device in accordance with some embodiments of the present disclosure.

FIGS. 1c-1d illustrates an exemplary environment for recommending one or more gestures to a user interacting with a computing device in accordance with some embodiments of the present disclosure.

FIG. 1c-1d shows a perspective view of a mobile phone and a gesture made by hand. As an example, the gesture shown in FIG. 1e is referred as "gesture 1" and the gesture shown in FIG. 1d is referred as "gesture 2". "Gesture 1" requires the user to keep his hand 5 cm away from screen of the mobile phone, stretch and bend the index finger to scroll the screen. "Gesture 2" requires the user to keep his hand 10 cm away from the screen, join the thumb and the index finger and move the thumb finger to scroll the screen. The gesture recommendation system 103 measures user's accuracy and comfort to perform the two gestures based on the above mentioned factors. As an example, in this scenario, the gesture which is performed with greater ease and accuracy is recommended to the user for scrolling. A proximity score 115 is assigned to each of the two gestures based on the predefined values for body proximity range and the phone proximity range as given in the tables below.

| Body Proximity Range | | |
|---|---|---|
| 1-5 | 5-10 | 15-20 |
| Score 10 | Score 5 | Score 1 |

| Phone proximity range | | |
|---|---|---|
| 1-5 | 5-10 | 15-20 |
| Score 10 | Score 5 | Score 1 |

The body proximity range is the distance between the hand during the gesture and body of the user. The proximity score 115 is assigned based on the proximity range between the body and the hand.

The phone proximity range is the distance between the hand during the gesture and the screen of the mobile phone. The proximity score 115 is assigned based on the proximity range between the hand and the mobile phone.

As an example, the distance between the body and the hand during "gesture 1" is 8 cm. Therefore, the proximity score 115 is 5. The distance between the hand and screen of the mobile phone during "gesture 1" is 5 cm. Therefore, the proximity score 115 is 10. The cumulative score for "gesture 1" is 15. Similarly, the distance between body and the hand during "gesture 2" is 17 cm. Therefore, the proximity score 115 is 1. The distance between hand and screen of the mobile phone during "gesture 2" is 10. Therefore, the proximity score 115 is 5. The cumulative score for "gesture 2" is 6. In an exemplary embodiment, the gesture recommendation system 103 suggests that "gesture 1" would be performed easily by the user instead of "gesture 2" since the proximity score for "gesture 1" is more than the proximity score for "gesture 2".

As an example, the number of fingers used in "gesture 1" is one and the angular movement of the finger used is 30 degrees. The number of fingers used in "gesture 2" is two and the angular movement is 40 degrees. The shape score 117 of gesture 1 may be 3. The shape score 117 of gesture 2 may be 8.

|  | Number of Fingers | Angular Movement | Shape score |
| --- | --- | --- | --- |
| Gesture 1 | 1 | 30 | 1 * (30/10) = 3 |
| Gesture 2 | 2 | 40 | 2 * (40/10) = 8 |

The number of muscles used to perform "gesture 1" is 3. The number of muscles used to perform "gesture 2" is 5. The strength score 119 for "gesture 1" is 3 and the strength score 119 for "gesture 2" is 5.

|  | Number of Muscles used | Strength score |
| --- | --- | --- |
| Gesture 1 | 3 | 3 |
| Gesture 2 | 5 | 5 |

Since, gesture 1 is easier to perform than gesture 2, let's assume that gesture 2 has higher noise score 113 than gesture 1.

|  | False positives | Error Count | Noise score |
| --- | --- | --- | --- |
| Gesture 1 | 1 | 3 | 4 |
| Gesture 2 | 5 | 10 | 15 |

Hence the cumulative score for gesture 1 and gesture 2 may be

|  | Proximity Score | Shape score | Strength score | Noise score | Cumulative Score |
| --- | --- | --- | --- | --- | --- |
| Gesture 1 | 1 | 3 | 3 | 4 | 11 |
| Gesture 2 | 10 | 8 | 5 | 15 | 38 |

In another exemplary embodiment, a predefined cumulative score may be 15. Since the cumulative score for "gesture 1" is less than the predefined score, the gesture recommendation system 103 may recommend suggestions to the user to improve gesture 1. The improved gesture 1 may be a change in gesture 1 to reduce the noise score 113 associated with gesture 1. The improved gesture may also be no change in the one or more gesture, is the noise score is 0 and cumulative score is 0. Also, since the cumulative score for "gesture 2" is more than the predefined cumulative score, the gesture recommendation system 103 may recommend suggestions to the user to change gesture 2. The changed gesture 2 may be a gesture which is performed more accurately by the user.

Figure 2:
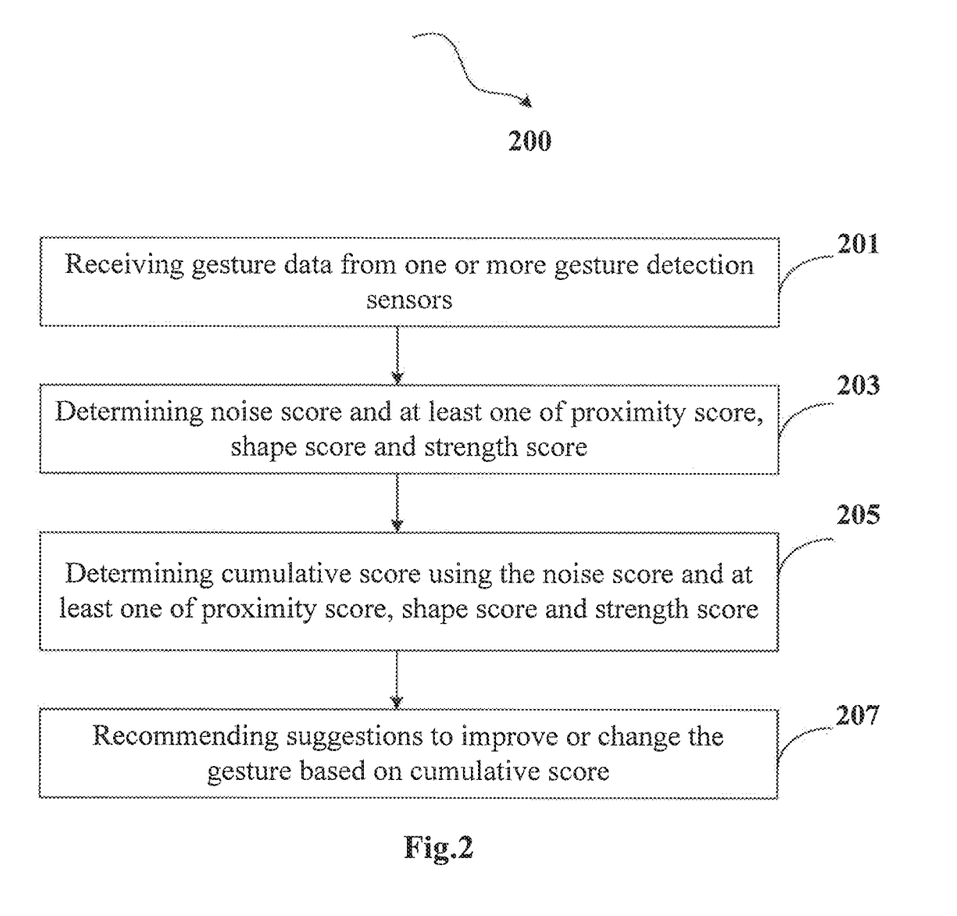
FIG. 2 illustrates a flowchart showing a method for recommending one or more gestures to a user interacting with a computing device in accordance with some embodiments of the present disclosure.

FIG. 2 illustrates a flowchart showing a method for recommending one or more gestures to a user interacting with a computing device in accordance with some embodiments of the present disclosure.

As illustrated in FIG. 2, the method 200 may comprise one or more blocks for recommending one or more gestures to a user interacting with a computing device using a gesture recommendation system 103. The method 200 may be described in the general context of computer executable instructions. Generally, computer executable instructions can include routines, programs, objects, components, data structures, procedures, modules, and functions, which perform particular functions or implement particular abstract data types.

The order in which the method 200 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 201, the gesture data may be received from one or more gesture detection sensors 101. The gesture detections sensors 101 such as proximity sensor, radar, image sensor and infrared muscle contraction sensor may be implemented in the computing device or may be associated with the computing device. The gesture detection sensors 101 may capture gesture data and provide the gesture data to the gesture recommendation system 103. The proximity sensor may detect proximity of body part associated the one or more gestures from the computing device. The radar may be used to detect number of body parts and angular movement of the body parts required to make the one or more gestures. The IR muscle contraction sensor may be used to detect number of muscles involved while making the one or more gestures.

At block 203, the noise score 113 and at least one of proximity score 115, shape score 117, or strength score 119 may be determined. The gesture recommendation system 103 may determine noise score 113 for each of the one or more gestures. The noise score 113 may represent a counter value to rank the gesture. The noise score 113 may be determined for each of the one or more gestures based on at least one of false positives associated with the one or more gestures or errors detected with the one or more gestures. The false positives associated with the one or more gestures may be the mistakes made by the user while making the one or more gestures. The errors detected with the one or more gesture may be each instant when each of the one or more gestures was not detected correctly by the computing device. The proximity score 115 may be determined for each of the one or more gestures based on distance between body parts associated with each of the one or more gestures from the computing device. The shape score 117 may be determined for each of the one or more gestures based on number of body parts required and angular movement of the body parts required to make each of the one or more gestures. The shape score 117 may be assigned in increasing order of number of body parts required and angular movement of the body parts required to make each of the one or more gestures. The strength score 119 may be determined for each of the one or more gestures based on number of muscles used to make each of the one or more gestures. The strength score 119 may be assigned in the increasing order of number of muscles used to make the gesture.

At block 205, the gesture recommendation system 103 may determine a cumulative score based on the noise score 113 and at least one of proximity score 115, shape score 117, or strength score 119. The cumulative score may be result of an arithmetic operation such as summation, multiplication, convolution of the noise score 113 and at least one of proximity score 115, shape score 117 or strength score 119. For example, Cumulative Score=Noise Score+Proximity Score+
Shape Score+Strength Score

|  | Proximity Score | Shape score | Strength score | Noise score | Cumulative Score |
| --- | --- | --- | --- | --- | --- |
| Gesture 1 | 1 | 3 | 3 | 4 | 11 |
| Gesture 2 | 10 | 8 | 5 | 15 | 38 |

At block 207, the gesture recommendation system 103 may recommend suggestions to the user to either change the gesture or improve the gesture based on the cumulative score. If the cumulative score is more than a predefined cumulative score, then the gesture recommendation system 103 may suggest the user to change the gesture. If the cumulative score is below the predefined cumulative score the recommendation system 103, then the gesture recommendation system 103 may suggest the user to improve the gesture.

Computer System

Figure 3:
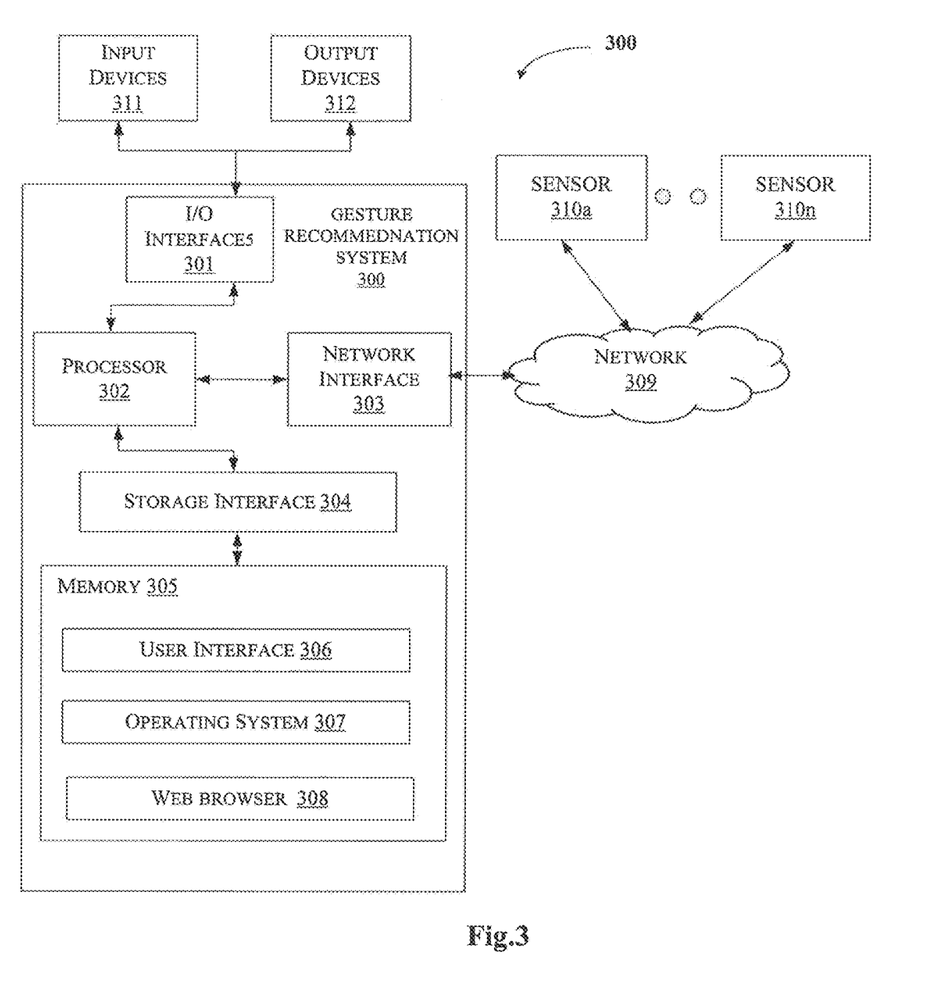
FIG. 3 illustrates a block diagram of an exemplary computer system for implementing embodiments consistent with the present disclosure.

FIG. 3 illustrates a block diagram of an exemplary gesture recommendation system 300 for implementing embodiments consistent with the present invention. In an embodiment, the gesture recommendation system 300 is used to recommend one or more gestures to a user interacting with a computing device. The gesture recommendation system 300 may comprise a central processing unit ("CPU" or "processor") 302. The processor 302 may comprise at least one data processor for executing program components for executing user- or system-generated business processes. A user may include a person, a person using a device such as such as those included in this invention, or such a device itself. The processor 302 may include specialized processing units such as integrated system (bus) controllers, memory management control units, floating point units, graphics processing units, digital signal processing units, etc.

The processor 302 may be disposed in communication with one or more input/output (I/O) devices (311 and 312) via I/O interface 301. The I/O interface 301 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 301, the gesture recommendation system 300 may communicate with one or more I/O devices (311 and 312).

In some embodiments, the processor 302 may be disposed in communication with a communication network 309 via a network interface 303. The network interface 303 may communicate with the communication network 309. The network interface 303 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 303 and the communication network 309, the gesture recommendation system 300 may communicate with one or more sensors 310 (a, . . . ,n). The communication network 309 can be implemented as one of the different types of networks, such as intranet or Local Area Network (LAN) and such within the organization. The communication network 309 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 309 may include a variety of network devices, including routers, bridges, servers, computing devices, storage devices, etc. The one or more sensors 310 (a, . . . ,n) may include, without limitation, a proximity sensor, image capturing device, radar and Infrared muscle contraction sensor.

In some embodiments, the processor 302 may be disposed in communication with a memory 305 (e.g., RAM, ROM, etc. not shown in FIG. 3) via a storage interface 304. The storage interface 304 may connect to memory 305 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 305 may store a collection of program or database components, including, without limitation, user interface application 306, an operating system 307, web server 308 etc. In some embodiments, gesture recommendation system 300 may store user/application data 306, such as the data, variables, records, etc. as described in this invention. Such databases may be implemented as fault-tolerant, relational, scalable, secure databases such as Oracle or Sybase.

The operating system 307 may facilitate resource management and operation of the gesture recommendation system 300. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 306 may facilitate display, execution, interaction, manipulation, or operation of program components through textual or graphical facilities. For example, user interfaces may provide computer interaction interface elements on a display system operatively connected to the gesture recommendation system 300, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the gesture recommendation system 300 may implement a web browser 308 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the gesture recommendation system 300 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transter Protocol (SMTP), or the like. In some embodiments, the gesture recommendation system 300 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method and system for recommending gestures to a user interacting with a computing device.

In an embodiment, the present disclosure provides a method wherein the machine adapts to the gesture provided by the user.

In an embodiment, the present disclosure provides a method wherein the system provides suggestions to user to change the gesture if there are any mistakes or if the machine is not able to detect the gesture.

In an embodiment, the present disclosure provides faster processing of gesture recognition by bridging the gap between machine learning and human learning.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Environment |
| 101 | Gesture detection sensor |
| 103 | Gesture recommendation system |
| 105 | I/O Interface |
| 107 | Processor |
| 109 | Memory |
| 111 | Gesture data |
| 113 | Noise score |
| 115 | Proximity score |
| 117 | Shape score |
| 119 | Strength Score |

| Reference Number | Description |
|---|---|
| 121 | Other data |
| 123 | Hand proximity analyzing module |
| 125 | Shape classification analyzing Module |
| 127 | Strength Analyzing module |
| 129 | Noise filter |
| 131 | Ranking module |
| 133 | Recommendation module |
| 135 | Other Modules |

What is claimed is:

1. A method for recommending one or more gestures to a user interacting with a computing device, the method comprising:
    receiving, by a gesture recommendation system, gesture data from one or more gesture detection sensors for each of the one or more gestures;
    determining, by the gesture recommendation system, a noise score, a proximity score, a shape score, and a strength score based on the gesture data;
    determining, by the gesture recommendation system, a cumulative score using the noise score, the proximity score, the shape score, and the strength score, wherein the proximity score is calculated based on a first score determined based on a body proximity range and a second score determined based on a phone proximity range, and wherein the first score is indicative of a first distance between body parts of the user associated with the one or more gestures from the body of the user and the second score is indicative of a second distance between the body parts from the computing device; and
    recommending, by the gesture recommendation system, suggestions as to at least of improving the one or more gestures and changing the one or more gestures based on the cumulative score.

2. The method as claimed in claim 1, wherein the suggestions are recommended to improve the one or more gestures when the cumulative score is less than a predefined cumulative score.

3. The method as claimed in claim 1, wherein the suggestions are recommended to change the one or more gestures when the cumulative score is more than a predefined cumulative score.

4. The method as claimed in claim 1, wherein the one or more gesture detection sensors comprise at least of a proximity sensor, radar, image sensor, or infrared muscle contraction sensor.

5. The method as claimed in claim 1, wherein the shape score is determined based on number of body parts required and angular movement of the body parts required to make the one or more gestures.

6. The method as claimed in claim 1, wherein the strength score is determined based on number of muscles used to make the one or more gestures.

7. The method as claimed in claim 1, wherein the noise score is determined based on at least one of false positives associated with the one or more gestures and errors detected with the one or more gestures.

8. A gesture recommendation system for recommending one or more gestures to a user interacting with a computing device, the gesture recommendation system comprising:
    at least one processor; and
    a memory storing instructions executable by the at least one processor, wherein the instructions configure the at least one processor to:
    receive gesture data from one or more gesture detection sensors for each of the one or more gestures;
    determine a noise score, a proximity score, a shape score and a strength score based on the gesture data;
    determine a cumulative score using the noise score, the proximity score, the shape score, and the strength score, wherein the proximity score is calculated based on a first score determined based on a body proximity range and a second score determined based on a phone proximity range, and wherein the first score is indicative of a first distance between body parts of the user associated with the one or more gestures from the body of the user and the second score is indicative of a second distance between the body parts from the computing device; and
    recommend suggestions as to at least of improving the one or more gestures and changing the one or more gestures based on the cumulative score.

9. The gesture recommendation system as claimed in claim 8, wherein the processor recommends suggestions to improve the one or more gestures when the cumulative score is less than a predefined cumulative score.

10. The gesture recommendation system as claimed in claim 8, wherein the processor recommends suggestions to change the one or more gestures when the cumulative score is more than a predefined cumulative score.

11. The gesture recommendation system as claimed in claim 8, wherein the one or more gesture detection sensors comprise at least of a proximity sensor, radar, image sensor or infrared muscle contraction sensor.

12. The gesture recommendation system as claimed in claim 8, wherein the processor determines the shape score based on number of body parts required and angular movement of the body parts required to make the one or more gestures.

13. The gesture recommendation system as claimed in claim 8, wherein the processor determines the strength score based on number of muscles used to make the one or more gestures.

14. The gesture recommendation system as claimed in claim 8, wherein the processor determines the noise score based on at least one of false positives associated with the one or more gestures and errors detected with the one or more gestures.

15. A non-transitory computer readable medium including instructions stored thereon that when processed by at least one processor cause a gesture recommendation system to perform the operations comprising:
    receiving gesture data from one or more gesture detection sensors for each of the one or more gestures;
    determining a noise score, a proximity score, a shape score and a strength score based on the gesture data;
    determining a cumulative score using the noise score and at least one of the proximity score, the shape score, and the strength score, wherein the proximity score is calculated based on a first score determined based on a body proximity range and a second score determined based on a phone proximity range, and wherein the first score is indicative of a first distance between body parts of the user associated with the one or more gestures from the body of the user and the second score is indicative of a second distance between the body parts from the computing device; and recommending suggestions as to at least of improving the one or more gestures and changing the one or more gestures based on the cumulative score.

16. The non-transitory computer readable medium as claimed in claim 15, wherein the instructions cause the processor to determine the shape score based on number of body parts required and angular movement of the body parts required to make the one or more gestures.

17. The non-transitory computer readable medium as claimed in claim 15, wherein the instructions cause the processor to determine the strength score based on number of muscles used to make the one or more gestures and noise score based on at least one of false positives associated with the one or more gestures and errors detected with the one or more gestures.

* * * * *